(12) United States Patent
Nishizaki et al.

(10) Patent No.: US 6,392,405 B1
(45) Date of Patent: May 21, 2002

(54) ROTATION DETECTION SENSOR RING AND METHOD OF MAKING THE SAME

(76) Inventors: Shiro Nishizaki; Yoshinori Nagai; Makoto Kaminaka, all of c/o Press Kogyo Co., Ltd., Fujisawa Factory, 2003-1 Endo, Fujisawa-shi, Kanagawa (JP)

(*) Notice: Subject to any disclaimer, the term of this patent is extended or adjusted under 35 U.S.C. 154(b) by 0 days.

(21) Appl. No.: 09/070,349

(22) Filed: Apr. 30, 1998

(30) Foreign Application Priority Data

Mar. 9, 1998 (JP) .......................................... 10-056771

(51) Int. Cl.[7] .............................................. G01P 3/488
(52) U.S. Cl. ..................... 324/173; 324/207.22; 29/894
(58) Field of Search ................... 324/173, 174, 324/166, 160, 207.22, 207.25; 29/894; 384/448

(56) References Cited

U.S. PATENT DOCUMENTS

| | | |
|---|---|---|
| 3,626,226 A | 12/1971 | Pauwels et al. |
| 3,890,517 A | 6/1975 | Marsh et al. |
| 3,916,234 A | 10/1975 | Stigall et al. |
| 4,017,756 A | 4/1977 | Davidson |
| 4,171,495 A | 10/1979 | McNinch, Jr. |
| 4,259,637 A | 3/1981 | Bloomfield et al. |
| 4,667,156 A | 5/1987 | Machino et al. |
| 4,795,278 A | 1/1989 | Hayashi |

FOREIGN PATENT DOCUMENTS

| | | |
|---|---|---|
| DE | 3702474 | 8/1987 |
| DE | 4230043 | 3/1994 |
| JP | 6154272 | 4/1986 |
| JP | 61139472 | 8/1986 |
| JP | 61163280 | 10/1986 |
| JP | 6387514 | 6/1988 |
| JP | 63246677 | 10/1988 |
| JP | 6430919 | 2/1989 |
| JP | 1126419 | 5/1989 |

Primary Examiner—Walter E. Snow
(74) Attorney, Agent, or Firm—Alan Kamrath; Rider, Bennett, Egan & Arundel, LLP

(57) ABSTRACT

A sensor ring is coaxially mounted on a free end portion of a rotating element for detecting rotations of the rotating element. The free end portion defines an axially extending cylindrical surface and a radially extending stop surface for mounting of the sensor ring. The sensor ring has a cylindrical portion which defines a cylindrical center opening to be press fitted over the axially extending cylindrical surface of the free end portion of the rotating element. The sensor ring also has a flange portion which extends diagonally radially outward from one end periphery of the cylindrical portion such that the flange portion abuts on the stop surface of the free end portion of the rotating element when the sensor ring is completely mounted on the rotating element. The diagonally extending flange portion can avoid a connection curvature between the axial and radial surfaces of the free end portion of the rotating element during the press fitting operation.

32 Claims, 8 Drawing Sheets

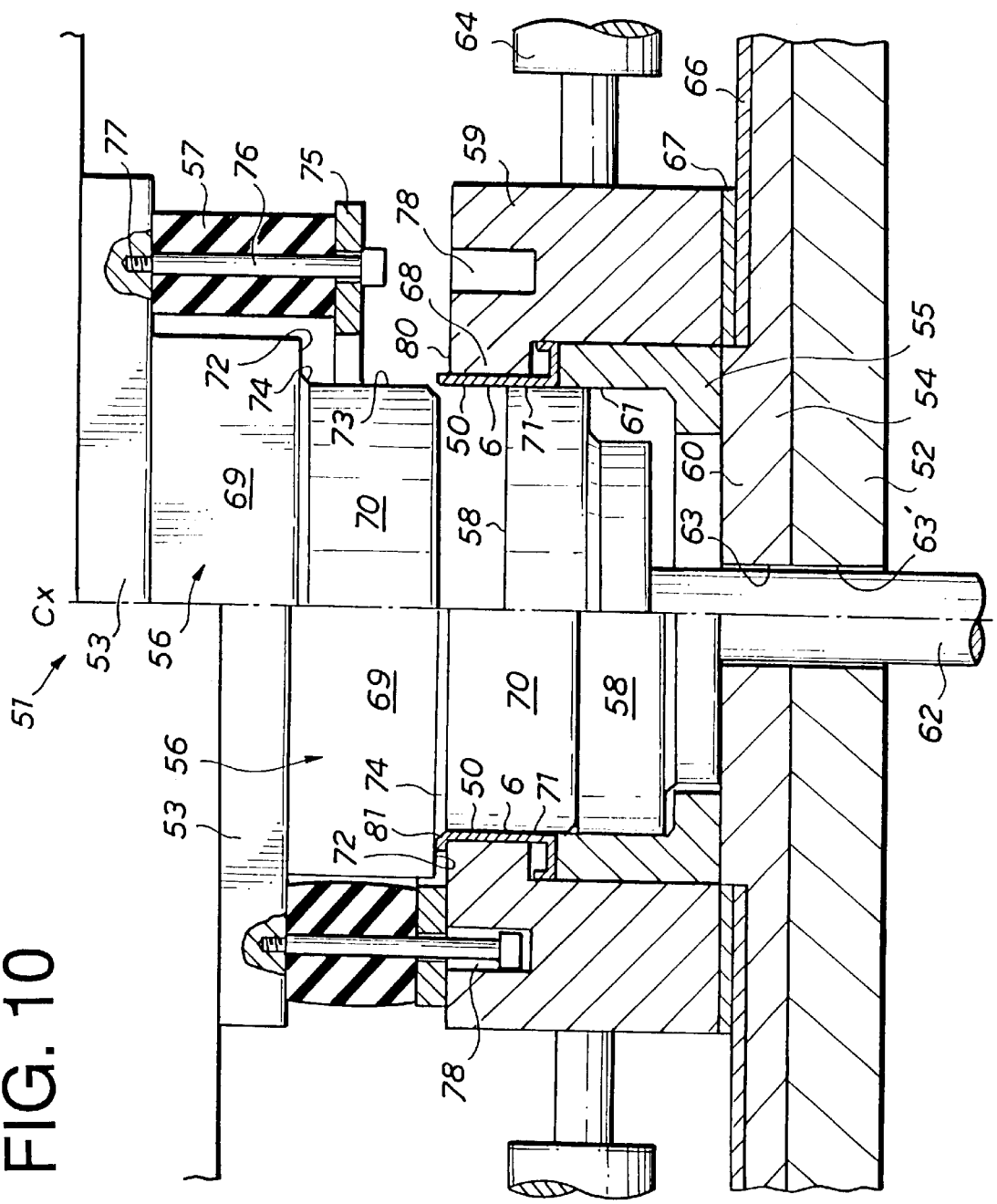

ROTATION DETECTION SENSOR RING AND METHOD OF MAKING THE SAME

BACKGROUND OF THE INVENTION

1. Technical Field

The present invention relates to a sensor ring used for detection of rotation of a rotating element and a method of manufacturing such a sensor ring.

2. Background Art

In general, a sensor ring is employed to detect rotation of a rotating element such as an axle of an automobile. The sensor ring has a cylindrical body mounted on the rotating element, an annular member extending from the cylindrical body in a radial direction of the cylindrical body and a plurality of openings formed in the annular member. These openings are spaced from each other in the circumferential direction of the annular member at constant pitches. A tooth is defined between each two adjacent openings of the annular member. The sensor ring is mounted on the rotating element such as an automobile axle, and a proximity sensor is provided nearby. The proximity sensor detects the teeth of the sensor ring which rotate with the rotating axle. The sensor ring and the proximity sensor in combination detect the rotational speed of the rotating element.

The sensor ring is generally press fitted over an outer periphery of a free end of the rotating element, and the free end of the rotating element has a stepwise portion in its outer periphery to receive the sensor ring. Specifically, the stepwise portion at the free end portion of the rotating element has an axially extending cylindrical surface to engage with an inner diameter portion of the cylindrical body of the sensor ring and a radially extending annular stop surface to support one end face of the sensor ring. The sensor ring is press fitted over the free end of the rotating element in the axial direction of the rotating element until it contacts the stop surface. The sensor ring seats on the radial stop surface of the rotating element so that the sensor ring is accurately positioned in the axial direction of the rotating element.

The cylindrical body of the sensor ring defines a center bore having a simple cylindrical surface to be fitted over the cylindrical surface of the stepwise free end portion of the rotating element.

The axially extending cylindrical surface and radially extending stop surface of the stepwise free end portion of the rotating element are formed by machining, and connection between these two surfaces is defined by an arcuate surface formed by a round nose of a cutting tool.

If a radius of the round nose of the cutting tool is relatively large, i.e., if the connection surface between the axially extending surface and radially extending surface of the rotating element has a relatively large radius of curvature, the end face of the sensor ring cannot abut on the stop surface of the rotating element when the sensor ring is press fitted over the rotating element. In such a case, positioning of the sensor ring in the axial direction of the rotating element and posture of the sensor ring relative to the stop surface (i.e., flatness of the sensor ring) are both unstable.

Even if the radius of the connection between the axial and radial surfaces of the free end portion of the rotating element is sufficiently small and the end face of the sensor ring can seat on the stop surface of the rotating element, the end face of the sensor ring may be deformed upon collision against the stop surface of the rotating element if the pressing force to press fit the sensor ring over the rotating element is excessively id great or If the press fitting operation is performed in an impacting way. This results in reduction of length of the sensor ring in the axial direction of the rotating element and causes instability in the axial position and horizontal posture of the sensor ring.

In order to press fit the sensor ring on the rotating element in a desired manner, it is ideal that the sensor ring is made from a one piece material having high stiffness and rigidity so that the sensor ring does not deform during the press fitting operation. Conventionally, the sensor ring is manufactured by sintering or machining. However, these manufacturing processes are complicated and troublesome. To simplify the manufacturing process, a press molding process is employed. A metallic plate material is press molded to a one piece product, but any conventional press molding method provides satisfactory products.

SUMMARY OF THE INVENTION

The present invention was conceived to eliminate the above described problems.

One object of the present invention is to provide a novel sensor ring which can always abut on the radial stop surface formed at the free end portion of the rotating element regardless of the size of connection curvature between the radial and horizontal surfaces of the free end portion of the rotating element and a manufacturing method of such a sensor ring.

Another object of the present invention is to provide a novel sensor ring which does not deform when it is press fitted over the free end portion of the rotating element and a manufacturing method of such a sensor ring.

Still another object of the present invention is to provide a novel sensor ring which is a one piece product manufactured from a plate material with high rigidity and a method of making the same.

Yet another object of the present invention is to provide a novel sensor ring which can be manufactured with a relatively small pressing force and a manufacturing method for such a sensor ring.

Still another object of the present invention is to provide a novel sensor ring which can suppress a manufacturing error and and a manufacturing method therefor.

According to one aspect of the present invention, there is provided a sensor ring of a type to be coaxially mounted on a free end portion of a rotating element for detecting rotations of the rotating element, the free end portion defining an axially extending cylindrical surface and a stop surface radially extending from the cylindrical surface for mounting the sensor ring thereon, characterized in that the sensor ring has a cylindrical portion which defines a cylindrical center opening to be press fitted over the axially extending cylindrical surface of the free end portion of the rotating element, and has a flange portion which extends radially outward from one end periphery of the cylindrical portion at an obtuse angle and abuts on the stop surface of the free end portion of the rotating element when the sensor ring is completely mounted on the rotating element.

Since the flange portion of the sensor ring extends diagonally outward in a radial direction from the periphery of the cylindrical portion of the sensor ring and has a gradually increasing diameter, the flange portion can avoid (or does not contact) a connection curvature between the axial and radial surfaces of the free end portion of the rotating element during the press fitting operation. As a result, the free end of the flange portion of the sensor ring can always abut on the radial stop surface of the rotating element. Thus, it is possible to locate the sensor ring on the rotating element at a desired position with desired flatness.

The flange portion of the sensor ring may have a chamfered inner surface to avoid the connection curvature between the axial and radial surfaces of the free end portion of the rotating element.

The free end of the flange portion may have a planar area which is parallel to the stop surface of the rotating element so that the flange portion of the sensor ring plane contacts the planar radial stop surface of the rotating element.

The sensor ring may have an annular sensing portion extending radially outward from the other end periphery of the cylindrical portion and an outer ring portion extending axially toward the flange portion from the outer periphery of the sensing portion to partly surround the cylindrical portion. The sensor ring is a one piece product having the cylindrical portion, the flange portion, the sensing portion and the outer ring portion.

A plurality of rectangular or square openings may be formed in the sensing portion at constant intervals in the circumferential direction of the sensor ring. Each of the openings may have a radially outer side which is furthest from the center of the sensor ring, a radially inner side which is closest to the center of the sensor ring, and two other sides connecting ends of the outer side with ends of the inner sides respectively. A radial position of the inner side of each opening may substantially be the same as that of the outer wall of the cylindrical portion of the sensor ring. The radial position of the outer side of the opening may substantially be the same as that of the inner wall of the ring portion.

According to another aspect of the present invention, there is provided a method of manufacturing a sensor ring from a blank of single plate material, the sensor ring blank including a cylindrical portion, a sensing portion extending radially outward from one end periphery of the cylindrical portion and an outer ring portion extending axially toward the other end periphery of the cylindrical portion from the outer periphery of the sensing portion to partly surround the cylindrical portion, characterized in that the blank is set on a lower metallic mold of the first mold unit with the sensing portion being directed downward (i.e., toward the lower mold) and the cylindrical portion being engaged with a nest plate provided on the lower mold, a presser mold is lowered toward the lower mold until it is received in a space defined by the cylindrical portion, sensing portion and outer ring portion so that the sensing portion is clamped between the presser mold and lower mold and the blank is held in position, a plurality of pierce punches are lowered toward the lower mold with downward movement of the pierce punches being guided by the presser mold to make a plurality of rectangular or square openings in the sensing portion at constant pitches in the circumferential direction of the sensing portion (piercing step), the blank is then removed from the lower mold of the first mold unit and set on a lower mold of the second mold unit with the inner wall of the cylindrical portion being supported by a first nest pin, the downwardly directed face of the sensing portion being supported by a stationary punch and the outer wall of the cylindrical portion being supported by a movable mold such that an upper length of the cylindrical portion slightly projects upward from the movable mold, an upper mold punch is lowered to sandwich the projecting length of the cylindrical portion between the upper mold punch and the movable mold thereby bending the projection length diagonally radially outward to form a flange portion of the sensor ring. Accordingly, the sensor ring having the flange portion is obtained.

By this manufacturing method, it is possible to make a sensor ring with high rigidity from a single plate material.

The pierce punches may be arranged with twice the pitch of the openings of the sensing portion so that the openings of the sensing portion are formed by first and second piercing operations. Between the first and second piercing operations, the blank may be rotated by one pitch of the sensing portion openings.

The lower mold of the first mold unit may have a plurality of bores (punch holes) to receive the pierce punches respectively. A second nest pin may be provided in the lower mold between two predetermined punch holes such that it is projectable from the upper surface of the lower mold. The nest pin may be pushed back and may not project during the first piercing operation. When the first piercing operation is finished and the blank is rotated by one pitch of the openings, the nest pin may project and fit in one of the pierced openings. Thus, positioning of the blank before the second piercing operation is accurately performed. Such a nest pin may be provided more than once. Recesses (or pin holes) for receiving the nest pins may be formed in the lower mold. Each of the nest pins may have a sharp free end. Each of the pin holes may have an oval cross section with its major axis extending in a radial direction of the sensor ring so that the nest pin holes are larger than the punch holes in the radial direction.

Each of the pierce punches may have a rectangular or square cross section and the presser mold may have mating rectangular or square grooves to slidably engage with and guide the pierce punches.

The upper mold punch of the second mold unit may have a lower smaller diameter portion to push down the first nest pin when the upper mold punch is lowered, an upper larger diameter portion for bending the projecting length of the cylindrical portion of the blank in a radially outward direction, and a C (chamfered) surface formed at a connection between the smaller and larger diameter portions. The smaller diameter portion may be in slide contact with the inner wall of the cylindrical portion of the sensor ring blank when the upper mold punch is moved downward.

The projecting length of the cylindrical portion may be determined to have a size such that the corner defined by a horizontal end face of the projecting length and the vertical inner wall of the cylindrical portion is collapsed by the lower surface of the large diameter portion of the upper mold punch.

The movable mold may have a vertically cylindrical surface which is exposed to and surrounds the peripheral wall of the small diameter portion of the upper mold punch when the upper mold punch is lowered, a horizontal annular surface which is exposed to the annular lower surface of the large diameter portion of the upper mold punch outside the C surface and a tapered surface which is exposed to the C surface of the upper mold punch and connects the vertical surface with the horizontal surface.

The tapered surface of the movable mold may be steeper than the C surface.

The length of the tapered surface may be about one half of that of the C surface in the radial direction of the sensor ring and the height of the tapered surface may be more than that of the C surface.

Additional objects, benefits and advantages of the present invention will become apparent to those skilled in the art to which the present invention relates from the following detailed description of the preferred embodiments and the appended claims as taken in conjunction with the accompanying drawings.

BRIEF DESCRIPTION OF THE ACCOMPANYING DRAWINGS

Figure 6:
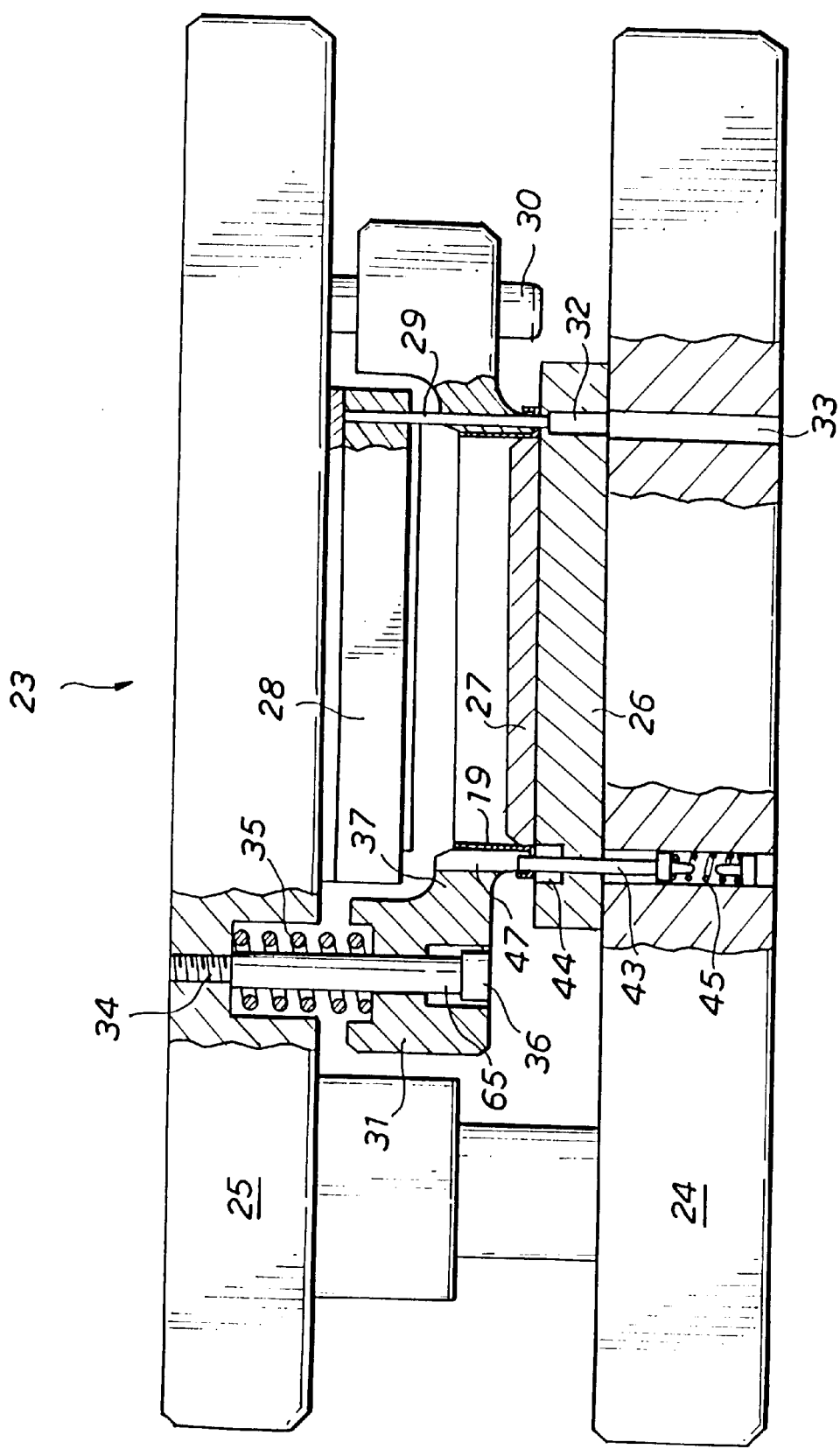
Figure 7:
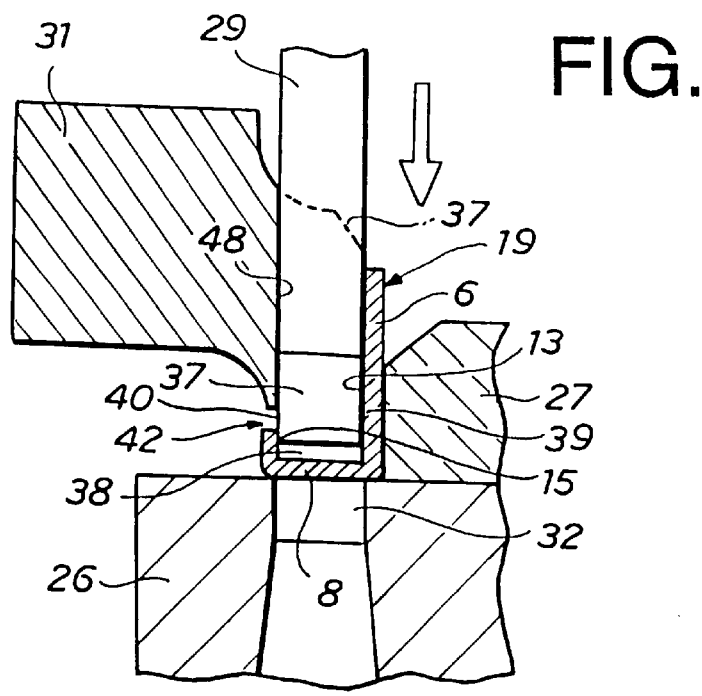
Figure 8:
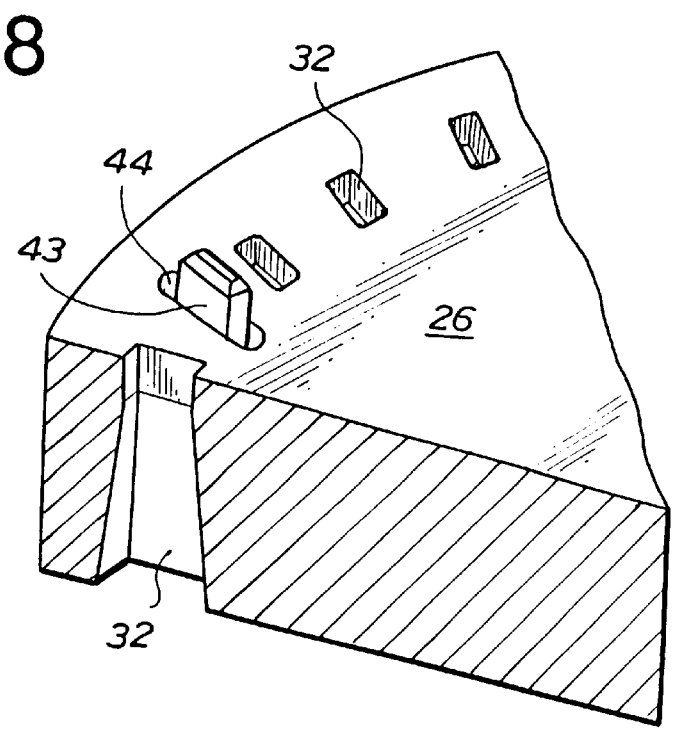
Figure 9:
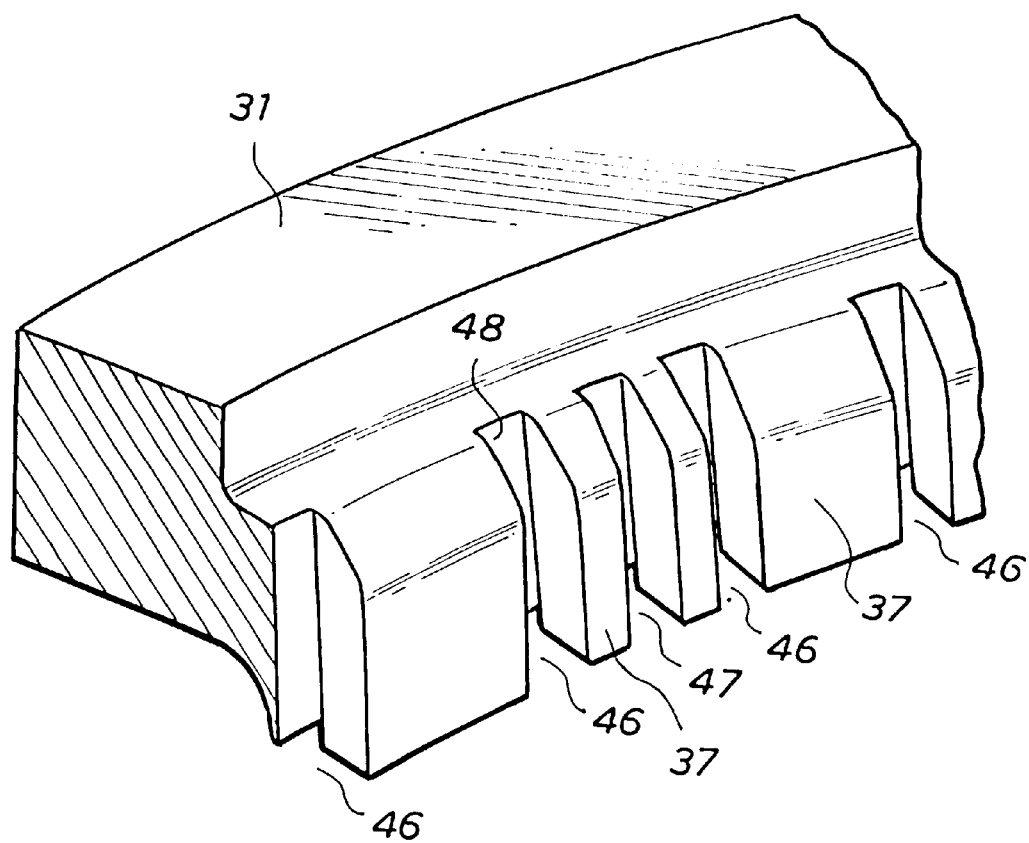
Figure 11A:
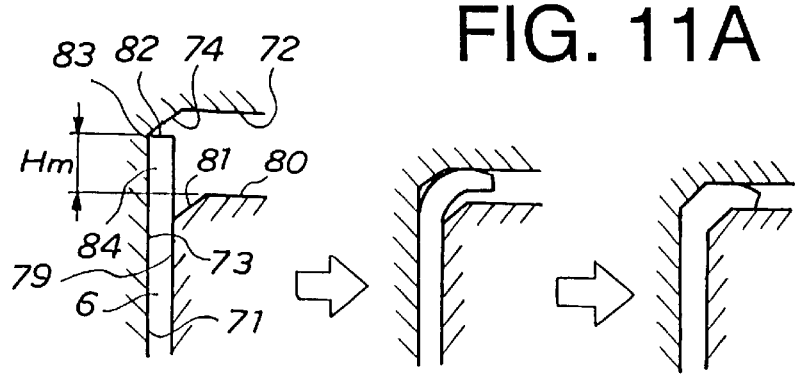
Figure 11B:
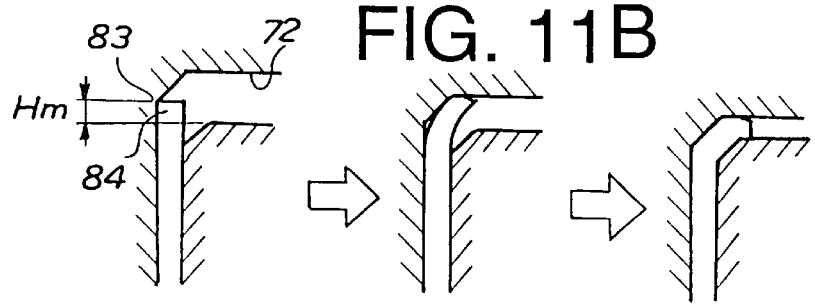
Figure 11C:
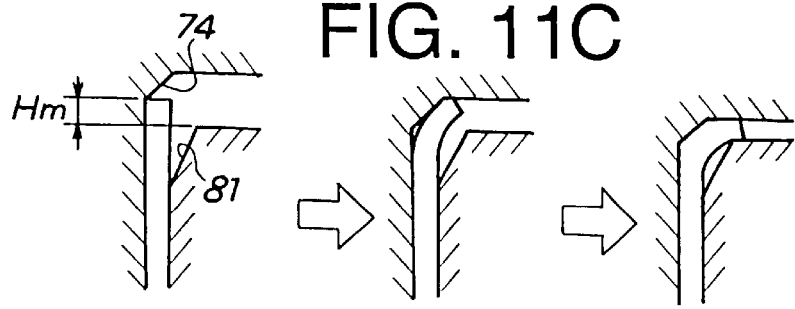
Figure 12:
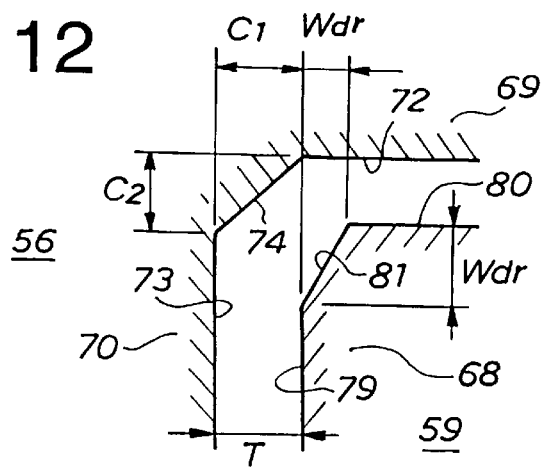

FIGS. 5A to 5E in combination depict a series of steps carried out to manufacture the blank from a single sheet material in vertical cross section;

FIG. 6 is a vertical, partly cross sectional view of the first mold unit illustrating two different planes;

FIG. 7 is an enlarged vertical cross section of the blank set on the first mold unit;

FIG. 8 is a perspective view of a die of the first mold unit and a nest pin;

FIG. 9 illustrates a presser mold in perspective view;

FIG. 10 illustrates the second mold get in vertical cross section, with the right half of the drawing showing when an upper mold is raised and the left half showing when the upper mold is lowered;

FIG. 11A illustrates how a flange portion of the sensor ring is molded when a projecting length of the cylindrical portion of the blank is relatively long;

FIG. 11B is a view similar to FIG. 11A, illustrating when the projecting length is relatively short;

FIG. 11C is a view also similar to FIG. 11A, illustrating when the projecting length is relatively short but extends steeper than FIG. 11B; and FIG. 12 is an enlarged sectional view of the second mold unit, particularly showing a C surface of an upper mold punch and a mating Inclined surface of a movable mold.

In the drawings, the terms such as "up(ward)", "down (ward)", "lower", "upper", "vertical", "horizontal", "right" and "left" are used to describe a construction of the sensor ring and a molding machine for making the sensor ring, but these terms are only used to facilitate understanding of an illustrated embodiment of the invention and are not used to limit the scope of the invention.

DETAILED DESCRIPTION OF THE PREFERRED EMBODIMENTS

Now, a preferred embodiment according to the present invention will be described with reference to the accompanying drawings. Like reference numerals are assigned to like parts in different drawings.

Figure 1:
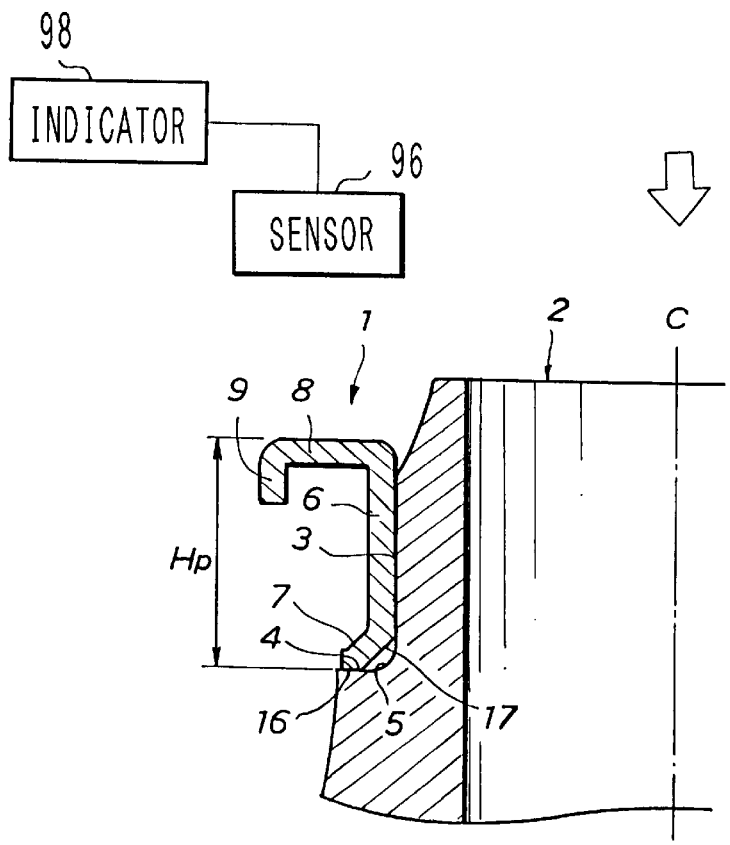
FIG. 1 is a vertical sectional view of a sensor ring according to the present invention when it is mounted on a rotating element.

Referring to FIG. 1, a sensor ring 1 is coaxially fitted over a hub 2 of an automobile axle. The hub 2 (or axle) is one example of a rotating element. The hub 2 has a generally cylindrical shape having a center line C. The hub 2 has a stepwise portion on its outer surface to form a cylindrical surface 3 and a stop surface 4. The cylindrical surface 3 has a particular diameter and a particular length in an axial direction of the automobile axle along the center line C. The stop surface 4 extends radially outward at a right angle relative to the cylindrical surface 3. The stop surface 4 defines an annular planar surface. The cylindrical surface 3 and stop surface 4 are formed by machining at high accuracy. These surfaces are connected with each other by a curving surface (R surface) 5 having a certain radius which is determined by a nose radius of a cutting tool used to form this curving surface 5.

The sensor ring 1 has a generally annular shape. The sensor ring 1 is mounted on the hub 2 from the top of FIG. 1 as indicated by the unshaded arrow. The sensor ring 1 is press fitted over the cylindrical surface 3 of the hub 2 until it abuts on the stop surface 4. Relative position of the sensor ring 1 to the hub 2 is determined in this manner. The sensor ring 1 includes a cylindrical portion 6 to be press fitted over the cylindrical surface 3 of the hub 2 and a flange portion 7 bending diagonally radially outward from the lower end of the cylindrical portion 6. The flange portion 7 abuts on the stop surface 4 when the sensor ring 1 is mounted on the hub 2.

The sensor ring 1 also includes a sensing portion 8 extending radially outward from the upper end of the cylindrical portion 6 and an outer ring portion 9 extending downward from the outer periphery of the sensing portion 8. The sensor ring 1 is a one piece product made from a metallic plate material having a predetermined thickness such as SPHC by pressing and bending. The method of making the sensor ring 1 will be described later in detail.

A proximity sensor 96 such as a magnetic sensor is provided near the sensor ring 1 to spacedly face the sensing portion 8 of the sensor ring 1. The proximity sensor 96 detects rotations of the sensor ring 1 (i.e., rotations of the rotating axle 2) and sends a particular signal to an indicator 98. The indicator 98 displays a rotational speed of the rotating axle 2.

Figure 2:
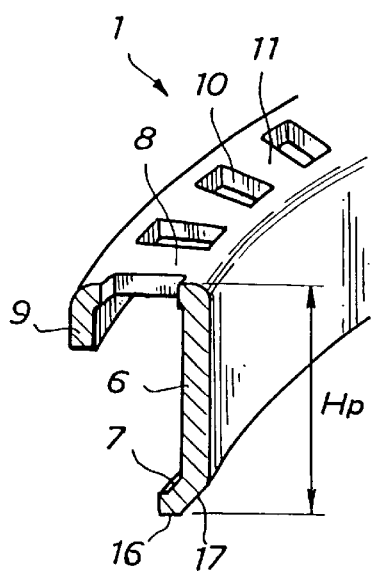
FIG. 2 is a fragmentary perspective view of the sensor ring shown in FIG. 1.

Referring to FIG. 2, the sensing portion 8 is used for detection of rotations of the rotating element (hub 2). The sensing portion 8 has a plurality of rectangular openings 10 along its periphery at constant intervals (pitches). A web or tooth 11 is defined between adjacent openings 10. The proximity sensor 96 (FIG. 1) detects the rotating webs 11 to determine the rotational speed of the hub 2.

Figure 3A:
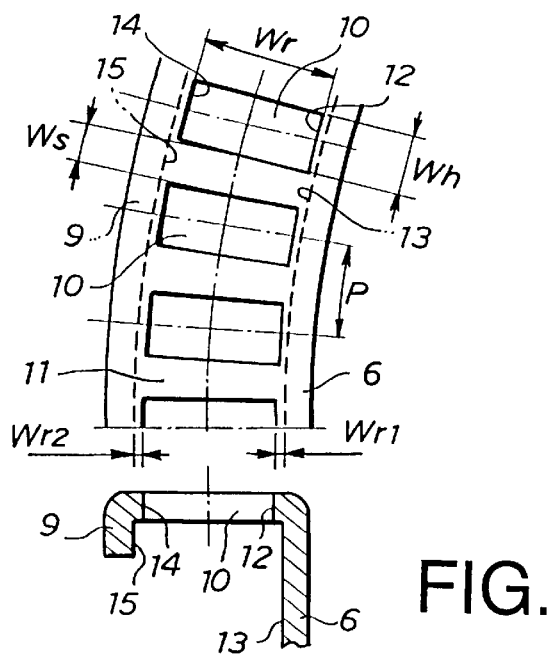
FIG. 3A illustrates a fragmentary plan view of the sensor ring shown in FIG. 1.
Figure 3B:
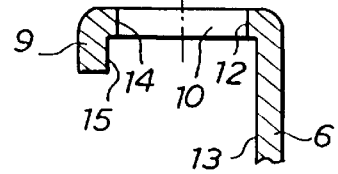
FIG. 3B illustrates a fragmentary vertical sectional view of the sensor ring shown in FIG. 3A.

Referring now to FIG. 3A, each of the rectangular openings 10 has an inner side (right side in the drawing) 12 which substantially overlaps the outer wall 13 of the cylindrical portion 6 when viewed from the above (best seen in FIG. 3B) and an outer side (left side in the drawing) 14 which substantially overlaps the inner wall 15 of the outer ring portion 9. Therefore, the width Wr of each rectangular opening 10 is substantially equal to the distance between the outer wall 13 of the cylindrical portion 6 and the inner wall 15 of the outer ring portion 9, and the radial positional difference Wr1 between the inner side 12 of the opening 10 and the outer wall 13 of the cylindrical portion 6 and the radial positional difference Wr2 between the outer side 14 of the opening 10 and the inner wall 15 of the outer ring portion 9 are both minute (less than 0.2 mm in this particular embodiment). P indicates a pitch of the rectangular openings 10. FIG. 3B illustrates the vertical cross section of the outer ring portion 9, opening 10 and the cylindrical portion 6.

It should be noted here that manufacturing the opening 10 having the width Wr which is substantially equal to the spacing between the outer wall 13 of the cylindrical portion 6 and the inner wall 15 of the outer ring portion 9 was difficult according to known methods. However, it is made possible by employing a novel and unique method which the inventors conceived (will be described later). Since there remains a solid part next to the rectangular opening 10 in both the radially outward and inward directions, rigidity is improved. In the illustrated embodiment, the rectangular opening 10 has the larger width Wr in the radial direction than the width Wh in the circumferential direction.

According to the manufacturing method of the invention, the ratio of the circumferential width Ws of the web 11 to the circumferential width Wh of the rectangular opening 10 can be reduced to 0.75 or less.

If the sensor ring 1 did not have the outer ring portion 9, the web or teeth 11 would project radially outward from the cylindrical portion 6 like a comb and rigidity of the sensing portion 8 would be considerably degraded. The ring 1 has the outer ring portion 9 so that the webs or teeth 11 are connected with each other and the sensing portion 8 has sufficient rigidity. In addition, the sensing portion 8 defines a planar surface at high accuracy as a whole.

Referring back to FIG. 1, the outer ring portion 9 is considerably shorter than the cylindrical portion 6 in the axial direction of the hub 2. The flange portion 7 extends diagonally downward at an obtuse angle from the cylindrical portion 6 (obtuse angle as measured from the outer wall of the cylindrical portion 6). When press fitting of the sensor ring 1 is completed, the flange portion 7 avoids the curving surface 5 of the hub 2 and contacts the stop surface 4 at a position radially outward of the curving surface 5 of the hub 2. As best seen in FIG. 2, that part of the flange portion 7 which abuts on the stop surface 4 has an annular planar surface 16. This surface 16 has a small width in a radial direction of the sensor ring 1. Thus, the flange portion 7 plane contacts the stop surface 4 by this annular surface 16. The inner peripheral wall 17 of the flange portion 7 is made by pressing (press molding) (will be described later) and defines a chamfer (C surface). In cross section, the inner peripheral wall 17 extends diagonally straight in a radially outward direction. Dimensions of the inner peripheral wall 17 (C1 and C2 in FIG. 12) are determined such that the inner peripheral wall 17 can avoid the curving surface 5 of the hub 2.

Since the above described flange portion 7 is provided, the sensor ring 1 does not contact the curving surface 5 of the rotating element 2 and can reach the stop surface 4 reliably in the sensor ring mounting operation. Consequently, it is possible to accurately position the sensor ring 1 relative to the hub 2 in the axial direction and to insure flatness (horizontal posture) of the sensing portion 8 relative to the stop surface 4 of the hub 2 or relative to the proximity sensor 96.

Rigidity of the lower end of the cylindrical portion 6 is also raised by the flange portion 7. Therefore, even if the sensor ring 1 is press fitted on the hub 2 with a heavy load or in an impacting manner, the cylindrical portion 6 would not deform upon abutting of the flange portion 7 onto the stop surface 4. This prevents reduction of length Hp of the sensor ring 1 in the axial direction upon mounting of the sensor ring 1. Accordingly, the sensor ring 1 (particularly the sensing portion 8 of the sensor ring 1) takes a desired and accurate position relative to the stop surface 4, and the sensor ring 1 (particularly the sensing portion 8 thereof) takes a desired and accurate posture relative to the center axis C of the hub 2 or the proximity sensor 96.

The flange portion 7 also raises rigidity of the entire sensor ring 1. Therefore, the sensing portion 8 does not deform during the press fitting operation.

Since the flange portion 7 has the planar surface 16 at its free end face, it has a relatively large contact area to the stop surface 4 as compared with the flange portion having a sharp or rounded free end. The planar surface 16 disperses a shock upon abutting onto the stop surface 4 and further prevents deformation of the sensor ring 1. Moreover, the sensing portion 8 can be located in a desired position in the axial direction and can extend at a right angle relative to the center line C of the hub 2 more accurately. Precise parallelism between the planar surface 16 and the sensing portion 8 or flatness of the planar surface 16 relative to the sensing portion 8 is easily realized by a pressing method which will be described later.

The sensor ring 1 is a one piece product made from a single plate material by a manufacturing method which will be described later. Thus, the sensor ring 1 is lightweight but has high rigidity. Accordingly, it is feasible to prevent deformation of the sensor ring 1 during the press fitting process and during its use.

Now, a method of manufacturing the sensor ring 1 will be described.

Figures 4A, 4B, 4C, 4D:
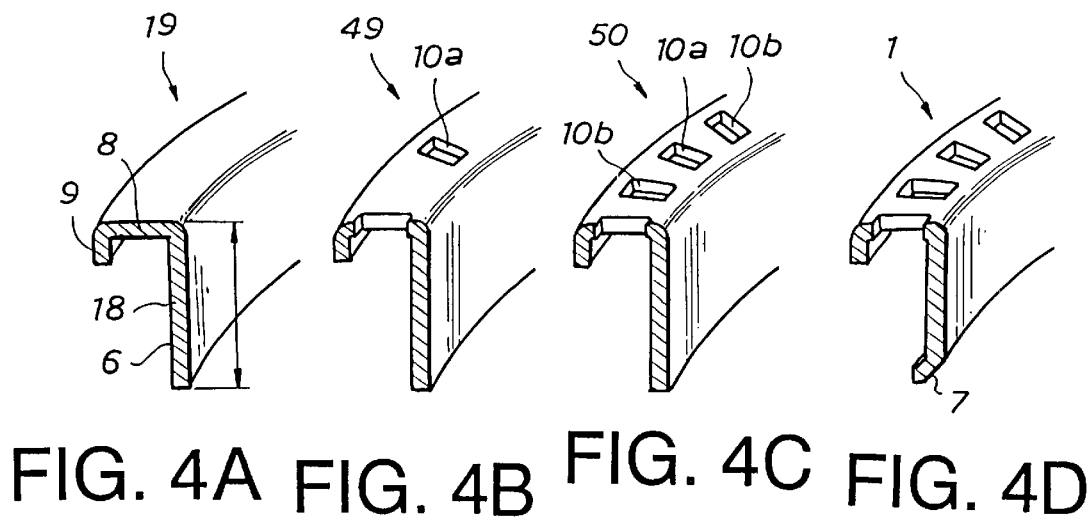
FIG. 4A illustrates a fragmentary perspective view of a blank.
FIG. 4B illustrates a perspective view of the blank when half of the openings are pierced in a sensing portion of the blank.
FIG. 4C illustrates a perspective view of the blank when all of the openings are formed in the blank.
FIG. 4D illustrates a perspective view of the sensor ring as completed.

Referring to FIGS. 4A to 4D, the manufacturing process is described briefly. As illustrated in FIG. 4A, a plate material 18 is molded to a blank 19 which has the cylindrical portion 6, the sensing portion 8 and the outer ring portion 9. Then, as shown in FIG. 4B, the first piercing step (49) is carried out to form half of (or every other) the rectangular openings 10a in the sensing portion 8. Subsequent to this, the second piercing step (50) is carried out to form the remainder of the rectangular openings 10b between the openings 10a as illustrated in FIG. 4C. At last, the lower end periphery of the cylindrical portion 6 is bent radially outward diagonally to form the flange portion 7 as Illustrated in FIG. 4D. The sensor ring 1 is accordingly manufactured.

Referring to FIGS. 5A to 5E, a method of manufacturing the blank 19 from the plate material 18 will be described.

Figure 5A:
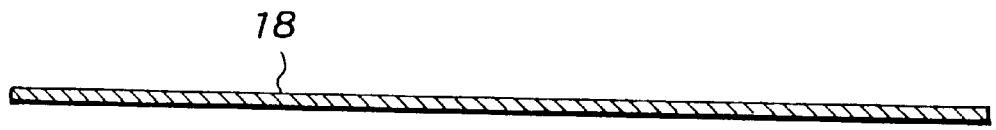
Figure 5B:
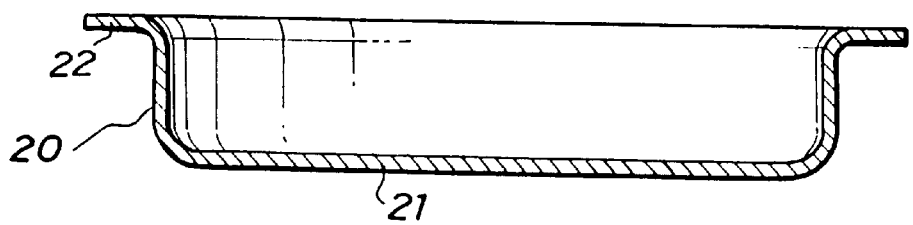
Figure 5C:
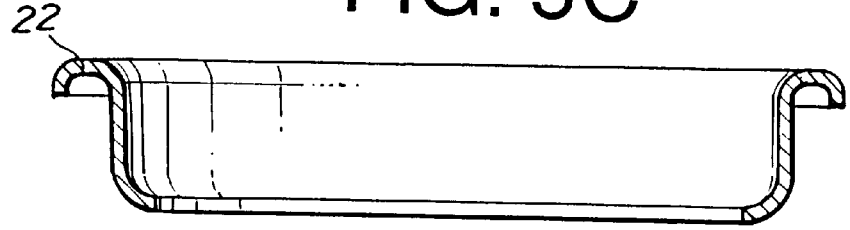
Figure 5D:
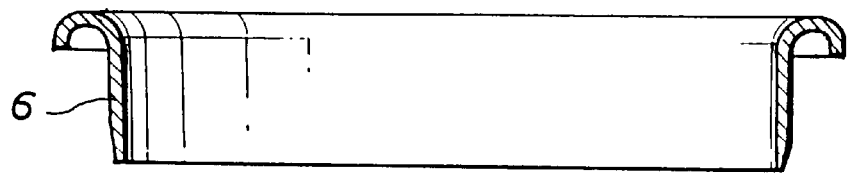
Figure 5E:
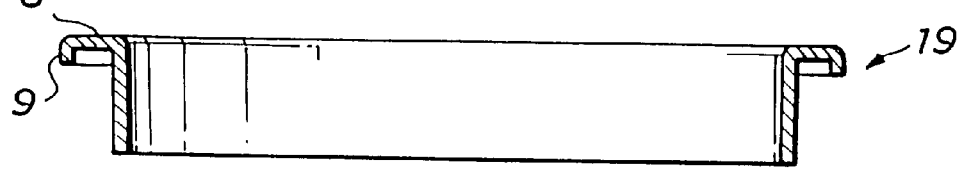

As illustrated in FIG. 5A, prepared is the plate material 18 which has a round shape if viewed from the above. The plate material 18 has an intermediate thickness (e.g., about 1 to 4 mm in this embodiment). This plate material 18 undergoes a drawing process to have a flange 22, a cylindrical body 20 and a bottom 21 as shown in FIG. 5B. Then, the bottom 21 is punched by piercing and the flange 22 is bent over downward like an inverted rounded U (or J) as depicted in FIG. 5C. Subsequent to this, the material 18 undergoes the burring process and the ironing process to form the cylindrical portion 6 having a linear cross section as illustrated in FIG. 5D. Finally, the inverted rounded U flange 22 is shaped to an inverted angled U as illustrated in FIG. 5E. As a result, the sensing portion 8 and the outer ring portion 9 are formed. In this manner, the blank 19 is prepared. Although it will be understood later, the sensing portion 8 and the outer ring portion 9 are molded with high precision. Particularly, their inner and outer diameters are important. Further, in order to suppress the molding load needed in forming the flange portion 7 of the sensor ring 1, the blank is molded to have a precise height.

Referring to FIG. 6, the blank 19 is now set on the first mold unit 23 to carry out the first and second piercing processes (49 and 50 in FIGS. 4B and 4C).

As illustrated in FIG. 6, the first mold unit 23 includes a lower mold 24 which is a stationary mold and an upper mold 25 which is a liftable mold. The lower mold 24 has a die 26 secured on an upper surface of the lower mold, and the die 26 has a nest plate 27 secured on an upper surface of the die 26. The upper mold 25 has a punch holder 28 on its lower surface. A plurality of pierce punches 29 each extending vertically downward are firmly supported from the punch holder 28. The pierce punches 29 are arranged in a circumferential direction at predetermined intervals so that the punches 29 can create the rectangular openings 10 in the sensing portion of the sensor ring 1 at the predetermined intervals. The upper mold 25 also has guide posts 30 and bolts 65 extending vertically downward therefrom. The guide posts 30 and bolts 65 are spacedly arranged in the circumferential direction of the upper mold 25 in a predetermined manner (e.g., alternately). A presser mold 31 is supported by the guide posts 30 and bolts 65 such that it can move up and down.

As best seen in FIG. 7, the blank 19 is placed on the die 26 with the sensing portion 8 being directed downward. When the blank 19 is set on the die 26, the cylindrical portion 6 fits over the nest plate 27 so that centering of the blank 19 is appropriately carried out.

The number of the pierce punches 29 is half of the required rectangular openings 10 and the pierce punch pitch in the circumferential direction is twice the rectangular opening pitch P (FIG. 3). Accordingly, the pierce punches 29 form every other one of the rectangular openings 10 (10a and 10b) in one operation. Each of the pierce punches 29 has a rectangular cross section which coincides with the shape of the rectangular opening 10. As illustrated in FIG. 6, the die 26 has punch holes 32 of a cross section similar to the pierce punch 29 to receive the pierce punches 29 penetrating through the blank 19. The number of the punch holes 32 is equal to that of the pierce punches 29. The punch holes 32 communicate with chute holes 33 formed in the lower mold 24. Refuse generated upon punching the blank 19 falls in the holes 32 and 33 and is discharged.

The guide posts 30 are simple pins attached to the lower surface of the upper mold 25. The guide bolts 65 have threaded portions 34 and are secured to the upper mold 25 by threaded engagement with the upper mold 25. A coil spring 35 is wound around each guide bolt 65 to bias the presser mold 31 downward. The presser mold 31 is clamped between heads 36 of the guide bolts 65 and the associated coil springs 35, and are generally moved together with the upper mold 25. When the presser mold 31 collides with the blank during downward movement of the upper mold 25, the presser mold 31 cannot move downward further. The upper mold 25 can move further downward due to compression of the coil springs 35. A repulsive force generated by the compressed coil springs 35 at this point causes the sensing portion 8 to firmly contact the die 26. After punching, this repulsive force from the springs 35 also serves as a stripping force to facilitate separation of the pierce punches 29 from the sensing portion 8.

Referring to FIG. 9, the presser mold 31 has a plurality of finger-like extensions 37 projecting downward from the inner peripheral wall thereof. As best illustrated in FIG. 7, these extensions 37 engage in a space 38 defined by the cylindrical portion 6, sensing portion 8 and outer ring portion 9 to hold the sensing portion 8 on the die 26 from above when the presser mold 31 is lowered toward the lower mold 24. A lower inner wall 39 and lower outer wall 40 of each extension 37, the outer wall 13 of the cylindrical portion 6 and the inner wall 15 of the outer ring portion 9 are precisely molded such that all of them can slide relative to each other. The outer wall 40 of each extension 37 has a cutout portion 42 to avoid intervening with the outer ring portion 9.

Referring to FIG. 8, a first nest pin 43 is provided in the die 26 such that it is projectable from the upper surface of the die 26. The first nest pin 43 is received in a pin hole 44 formed in the die 26 and moves up and down. The pin hole 44 guides this movement of the first nest pin 43. The first nest pin 43 projects from the die 26 when the second piercing process is conducted (FIG. 4C) but retracted or pushed down in the pin hole 44 when the first piercing process is conducted (FIG. 4B). As shown in FIG. 6, a spring 45 is located in the pin hole 44 to bias the first nest pin 49 upward. In a normal situation, in addition to during the second piercing process, the first nest pin 43 projects from the upper face of the die 26.

The top of the first nest pin 43 is a sharp free end like a roof. The radial position of the pin hole 44 is the same as the punch holes 32. The pin hole 44 is located at a midway between two particular adjacent punch holes 32. In other words, the pin hole 44 is spaced from the nearest punch hole 32 by one pitch P in the circumferential direction. The pin hole 44 is an elongated oval hole as compared with the punch hole 32 with its major axis extending in a radial direction of the die 26 (longer than the punch hole 32 in the radial direction of the die 26), and has rounded ends at inner and outer radial ends if viewed from the above. Although only one first nest pin 43 and one pin hole 44 are illustrated in FIG. 8, a plurality of pairs of nest pin and holes may be provided at predetermined intervals in the circumferential direction of the die 26. The width of the first nest pin 43 in the circumferential direction of the die 26 is slightly smaller than that of the pierce punch 29.

As illustrated in FIG. 9, the fingers 37 of the presser mold 31 have groove-like vertical spaces 46 and 47 between the fingers 37 to allow passage of the pierce punches 29 and first nest pins 43. The grooves 46 are for the pierce punches 29 and the grooves 47 are for the first nest pins 43. In particular, each of the grooves 46 has three vertical surfaces to slidably guide the associated pierce punch 29 as understood from FIG. 7. One surface 48 of the three vertical surfaces of each groove 46 is directed radially inward and takes the substantially same radial position as the inner wall 15 of the outer ring portion 9 so that it cooperates with the outer wall 13 of the cylindrical portion 6 to accurately guide the associated pierce punch 29. By employing the above described construction, it is possible to firmly and reliably hold the blank 19 around the rectangular openings 10 by the fingers 37 of the presser mold 31 and to form the rectangular openings 10 having the width Wr substantially equal to the clearance between the outer wall 13 of the cylindrical portion 6 and the inner wall 15 of the outer ring 9.

The first piercing process using the first mold set 23 will be performed in the following manner. As illustrated in FIG. 6, the blank 19 Is placed on the die 26 with the sensing portion 8 being directed downward. In this situation, the first nest pins 43 are pressed downward by the sensing portion 8 so that they are completely received in the associated pin holes 44. Then, the upper mold 25 is lowered together with the presser mold 31. As a result, the fingers 37 of the presser mold 31 engage in the space 38 between the cylindrical portion 6, sensing portion 8 and outer ring portion 9 of the blank 19, and hold the sensing portion 8 against the die 26 from the above. Consequently, the blank 19 is held in the three directions. When the fingers 37 of the presser mold 31 firmly press the sensing portion 8 on the die 26, downward movement of the presser mold 31 is stopped but the upper mold 25 still moves downward since the coil springs 35 around the guide bolts 65 allow such movement of the upper mold 25. The pierce punches 29 are supported from the upper mold 25 so that they create half of the rectangular openings 10 (10a in FIG. 4B) simultaneously as the upper mold 25 moves downward.

After the first piercing step (49), the upper mold 25 is moved upward. The presser mold 31 is pressed downward against the die 26 by the repulsive force exerted by the coil springs 35 so that the sensing portion 8 is held on the die 26 while the pierce punches 29 are being lifted up from the rectangular openings 10. As the upper mold 25 is further raised, the fingers 37 of the presser mold 31 leave the space 38 and then the blank 19 is pushed up by the first nest pins 43. The first nest pins 43 project from the upper surface of the die 26 in this situation. As a result, the blank 19 after the first piercing process 49 "floats" from the die 26 with the cylindrical portion 6 being still fitted over the nest plate 27. Subsequent to this, the blank 19 (49) is rotated by one pitch P in the circumferential direction so that the projecting first nest pins 43 fit in the rectangular openings 10 just pierced and the blank 19 (49) is caused to seat on the die 26 again. In this manner, the blank 19 (49) is easily set on the die 26. Further, the blank 19 (49) is accurately positioned in the circumferential direction. Since the free end of each of the first nest pins 43 is sharp pointed, the first nest pin 43 fits in the associated opening 10 easily and reliably.

Next, the second piercing process 50 (FIG. 4C) is carried out. The upper mold 25 is moved down together with the punch pierce punches 29 to form the remaining half of the rectangular openings 10 (10b). In this situation, the first nest pins 43 project through the blank 19 and are received in the grooves 47 of the presser mold 31. After all of the rectangular openings 10 (10a and 10b) are formed in the sensing portion 8, the upper mold 25 is lifted up and the blank 19 (50) is picked up. The entire piercing process is completed in this manner.

Referring to FIG. 10, the blank 50 is then set on the second mold unit 51 to perform the bending process to the cylindrical portion 6. In the drawing, the right side of the center line Cx illustrates when an upper mold 53 is lifted up and the left side illustrates when the upper mold 53 is moved down.

The second mold unit 51 includes a stationary lower mold 52 and the elevatable upper mold 53. The lower mold 52 has a lower mold riser 54 fixed on the upper surface of the lower mold 52, and the lower mold riser 54 has a punch 55 fixed on the upper surface of the lower mold riser. The upper mold 53 coaxially has an upper mold punch 56 mounted on the lower face thereof, and a ring-shaped resilient member 57 is also provided on the lower face of the upper mold 53 around the punch 56, The lower mold 52 also has a second nest pin 58 on its upper face such that the second nest pin 58 can move up and down. A movable mold 59 is also provided on the upper face of the lower mold 52 such that the mold 59 can move in a radial direction.

The lower mold riser 54 has a stepwise upper surface to define a cylindrical projecting part 60 around its center. The fixed punch 55 is a ring-shaped member with its outer diameter being the same diameter as the projecting part 60. The punch 55 is coaxially secured on the projecting part 60. The punch 55 has an L-shaped cross section with its shorter side being directed radially inward in order to stabilize the seating of the punch 55 on the mold riser 54. The blank 50 with the sensing portion 8 being directed downward is placed on the top of the longer side of "L" of L the punch 55. The punch 55 has a radial thickness which is substantially equal to the radial length of the sensing portion 8 of the blank 50. The second nest pin 58 is in slidable contact with the inner wall 61 of the fixed punch 55. In the normal condition, as illustrated in the right half of FIG. 10, the second nest pin 58 is maintained in a posture projecting from the fixed punch 55.

The second nest pin 58 has a shaft 62 extending vertically downward from the lower face thereof, and the pin shaft 62 extends through a center bore 63 of the lower mold riser 54 and a coaxial center bore 63' of the lower mold riser 52. The pin shaft 62 is biased upward by a biasing means (not shown) but an upper positional limitation of the pin shaft 62 is regulated by a stop means (not shown). Therefore, the second nest pin 58 is maintained at the illustrated position during the normal condition although an upward force is acting on the second nest pin 58.

The movable mold 59 has a cylindrical shape surrounding the fixed punch 55 and is comprised of a plurality of segments divided in the circumferential direction (two semicircular segments in this particular embodiment). The segments can move radially. In the illustrated embodiment, a cylinder unit (actuator unit) 64 is attached to an outer wall of each mold segment 59 to relocate the associated mold segment 59 in the radial direction. The mold segments 59 move horizontally on a plane outside the projecting part 60 of the lower mold riser 54. For smooth sliding movement of the mold segments 59, a slider 66 is attached to the upper surface of the lower mold riser 54 outside the projecting part 60 and a mating slider 67 is attached to the lower surface of the movable mold 59. The movable mold 59 has an upper extension 68 projecting radially inward from an inner upper wall thereof.

When the blank 50 is set in the second mold unit 51, the movable mold segments 50 are moved radially outward beforehand. The blank 50 is placed on the fixed punch 55 with the sensing portion 8 directed downward. In this situation, the cylindrical portion 6 of the blank 50 fits over the second nest pin 58 so that centering of the blank 50 is appropriately performed. After that, the movable mold segments 59 are moved radially inward as illustrated in FIG. 10 until the radial extensions 68 of the movable mold segments 59 hold the cylindrical portion 6 from the outer lateral side. The radial extensions 68 have a height not to intervene with the outer ring portion 9 of the blank during this radially inward movement. An approximate center part of the cylindrical portion 6 in its height direction is clamped by the radial extensions 68 of the movable molds 59 and the second nest pin 58 with an appropriate load in the radial direction of the cylindrical portion 6. In this manner, the blank holding process is completed. In this situation, the upper free end of the cylindrical portion 6 slightly projects from the upper surface 80 of the movable mold 59.

The resilient member 57 is made from a resilient material such as urethane rubber. The resilient member 57 is sandwiched by the upper mold 53 and a ring plate 75 and secured to the upper mold 53 by bolts 76. Each of the bolts 76 has a threaded part 77 and the threaded part 77 is buried in the upper mold 53 such that the resilient member 57 can have a natural length in the normal condition as shown in the right half of the drawing.

The upper mold punch 56 has a stepwise cylindrical shape comprised of an upper large diameter part 69 and a lower small diameter part 70. Like the second nest pin 58, the small diameter part 70 has an outer diameter substantially equal to the inner diameter of the cylindrical portion 6 of the blank 50 so that the small diameter part 70 slidably contacts the inner wall 71 of the cylindrical portion 6 of the blank 50. The large diameter part 69 defines a step surface 72, which is a lower surface of the large diameter part 69, the small diameter part 70 defines an outer peripheral wall 73, and a C surface 74 connects the surface 72 with the surface 73. The punch 56 has the above described construction in order to form the C surface 17 of the sensor ring 1 (FIGS. 1 and 2). FIG. 12 illustrates the detail of the C surface 74 of the punch 56.

As also illustrated in FIG. 12, the radial extension 68 of the movable mold 59 has an inclined surface 81 connecting its horizontal upper surface 80 with its vertical inner wall 79. The C surface 74 of the punch 56 has a radial length Cl and a height C2. In the illustrated embodiment, C1=C2 so that the C surface 74 extends at 45 degrees relative to the height direction of the punch 56 as well as the radial direction. However, the taper surface 81 of the movable mold 59 extends at a steeper angle as compared with the C surface 74. Specifically, the taper surface 81 has a radial width Wdr which is approximately a half of C1 of the C surface 74 and one height Wdh which is greater than C2 of the C surface 74. The reason why the taper surface 81 possesses these dimensions will be described later. The gap between the outer wall 73 of the small diameter part 70 of the punch 56 and the inner wall 79 of the radial extension 68 of the movable mold 59 is equal to the thickness T of the cylindrical portion 6 of the sensor ring 1.

After the blank 50 is appropriately set on the second mold unit 51, the upper mold 53 is caused to descend as illustrated in the left half of FIG. 10 so that the small diameter part 70 of the upper mold punch 56 fits in the cylindrical portion 6 of the blank 50. The lower end face of the small diameter part 70 is chamfered along its periphery so that the small diameter part 70 is easily and reliably inserted in the cylindrical portion 6. During insertion, the outer wall 73 of the small diameter part 70 slides along the inner wall 71 of the cylindrical portion 6.

In the meantime, the small diameter part 70 collides on the second nest pin 58 and pushes the second nest pin 58 downward out of the blank 50. Although the second nest pin 58 which maintains centering of the blank 50 is disengaged from the blank 50, the small diameter part 70 now fits in the cylindrical portion 6 so that off centering of the blank 50 is prevented.

Then, the ring plate 75 next to the large diameter part 69 abuts on the movable mold 59 and the resilient member 57 is compressed in the axial direction to a certain extent. A repulsive force generated thereupon forces the movable mold 59 downward against the lower mold riser 54. This prevents the movable mold 59 from moving out of position in the vertical and radial directions. As the upper mold 53 further descends, the lower end (head) of each bolt 76 leaves the ring plate 75 down-ward but this projecting bolt is received in an associated recess 78 formed in the movable mold 59.

Eventually, the upper free end of the cylindrical portion 6 is clamped between the C surface 74 and planar step surface 72 of the upper mold punch 56 and the taper surface 81 and planar upper surface 80 of the movable mold 59, and is bent radially outward in a diagonally upward direction in the drawing. The movable die 59 therefore also serves as a die. This bending process is continued until the second nest pin 58 abuts on the lower mold riser 54 (lower dead point). Upon completion of the bending process, the flange 7 of desired shape is formed. Accordingly, the sensor ring 1 is prepared. The upper mold 53 is lifted up and the movable molds 59 are slid radially outward for picking up of the product 1.

Now the bending process will be described in detail.

FIGS. 11A, 11B and 11C illustrate different examples of bending process. Specifically, FIG. 11A depicts an example where the projecting length Hm of the cylindrical portion 6 is relatively large and the taper surface 81 has the same size and extends in the same direction as the C surface 74, FIG. 11B depicts an example where the projecting length Hm is relatively short and the same taper surface 81 as FIG. 11A is employed, and FIG. 11C depicts an example where the projecting length Hm is relatively short and the taper surface 81 extends steeply as shown in FIG. 12 (present invention).

In the case of FIG. 11A, as the upper mold punch 56 moves down, the intersection corner 83 of the top end face 82 and inner wall 71 of the cylindrical portion 6 first hits the C surface 74. Then, the corner 83 of the cylindrical portion 6 slides on the C surface 74, and a length 84 of the cylindrical portion 6 over the taper surface 81 is bent radially outward. Since the length 84 is relatively long, it curls during the bending process. The curled length 84 slides on the step surface 72 of the punch 56. Finally the curled length 84 is pressed between the step surface 72 of the punch 59 and the upper surface of the movable mold 59 to create the planar abutment surface 16 of the sensor ring 1 (FIGS. 1 and 2). In this example, therefore, it is required to straighten the curling of the bent portion. A relatively heavy molding force is needed accordingly.

In the case of FIG. 11B, since the projecting length Hm is relatively short, the length 84 of the cylindrical portion 6 does not curl when it is bent along the C surface 74. The abutment surface 16 is molded when the corner 83 is pressed between the step surface 72 of the punch 56 and the upper surface 80 of the movable mold 59. The length 84 does not curl, and straightening the curled length is not needed. Therefore, the molding force required is less than the case of FIG. 11A.

However, when the corner 83 is squeezed, the length 84 tends to fatten. In FIG. 11B, there Is not a sufficient space between the C surface 74 and the taper surface 81 so that socalled closed forging occurs (right drawing of FIG. 11B). There is a possibility that the sensing portion 8 would deform as a result of downward movement of the material under a certain compression condition if the closed forging occurs. Therefore, the FIG. 11B case also requires a heavy molding force and results in deterioration of flatness of the sensing portion 8. In addition, the movable mold 59 may also deform. In particular, the movable mold 59 cannot bear a heavy load due to its structure.

In the case of FIG. 11C, there is a sufficient space between the C surface 74 and the taper surface 81 at the final stage of bending process (right drawing of FIG. 11C). Therefore, the material is able to fatten and escape in this space. Consequently, the closed forging can be avoided and associated problems do not occur. The widths Wdr and Wdh of the inclined surface 81 (FIG. 12) are determined in the above described aspect.

It can be said from another point of view that the inclined surface 81 of FIG. 11C extends closer to the outer wall 73 of the small diameter part 70 or the C surface 74 than that of FIG. 11A (or 11B), with the gap between the surfaces 73 and 79 being the same.

The illustrated embodiment therefore provides a desired sensor ring 1.

Since the piercing process to form the rectangular openings 10 in the sensing portion 8 is divided by the first and second processes 49 and 50 (FIGS. 4B and 4C) and the best inclined surface 81 is selected (FIG. 12), the less molding load is needed and the molding process becomes easier.

Furthermore, the manufacturing machine (first mold unit 23, second mold unit 51 and associated components such as drive units) can be designed to be compact and inexpensive.

Since the first nest pins 43 are utilized, an error in the pitches between the rectangular openings in the sensing potion 8 is quite small. Since the presser mold 31 firmly holds the blank 19 around the first nest pins 43, deformation of the material is prevented. Although the nest pin holes 44 are formed between the punch holes 32 in the die 26 as understood from FIG. 8 and weaken the die 26, the elongated shape of the pin holes 44 considerably reduces possibility of breakage of the die 26.

The sensor ring and method of making the same are disclosed in Japanese Patent Application No. 10-56771 filed Mar. 9, 1998 in Japan and the entire disclosure of this Japanese Patent Application is incorporated herein by reference.

What is claimed is:

1. A sensor ring to be coaxially mounted on a free end portion of a rotating element for detecting rotations of the rotating element, the free end portion being defined by an axially extending cylindrical surface, a radial stop surface radially extending from the cylindrical surface and a curvature surface connecting the cylindrical surface with the radial stop surface, comprising:

a cylindrical portion which defines a cylindrical center opening to be press fitted over the axially extending cylindrical surface of the free end portion of the rotating element; and a flange portion which extends diagonally in a radially outward direction from one end periphery of the cylindrical portion such that the flange portion avoids the curvature surface between the cylindrical surface and the radial stop surface of the free end of the rotating element and abuts on the radial stop surface when the sensor ring is completely mounted on the free end portion of the rotating element;

wherein the flange portion of the sensor ring has a chamfered surface on its inner wall exposed to the connection curvature of the free end portion of the rotating element to avoid the connection curvature of the free end portion of the rotating element.

2. The sensor ring of claim 1, wherein a free end of the flange portion which abuts on the stop surface of the rotating element upon mounting of the sensor ring on the rotating element has a planar abutment surface such that the flange portion plane contacts the stop surface of the rotating element.

3. A sensor ring to be coaxially mounted on a free end portion of a rotating element for detecting rotations of the rotating element, with the free end portion being defined by an axially extending cylindrical surface and a radial stop surface radially extending from the cylindrical surface and a curvature surface connecting the cylindrical surface with the radial stop surface, comprising:

a cylindrical portion which defines a cylindrical center opening to be press fitted over the axially extending cylindrical surface of the free end portion of the rotating element;

a flange portion extending diagonally radially outward from one end periphery of the cylindrical portion such that the flange portion avoids the curvature surface between the cylindrical surface and the radial stop surface of the free end of the rotating element and to abut on the radial stop surface when the sensor ring is completely mounted on the free end portion of the rotating element;

an annular sensing portion extending radially outward from the other end periphery of the cylindrical portion; and an outer ring portion extending axially toward the flange portion from an outer periphery of the sensing portion to partly surround the cylindrical portion, and wherein the sensor ring is a one piece product having the cylindrical portion, the flange portion, the sensing portion and the outer ring portion.

4. The sensor ring of claim 2 further including an annular sensing portion extending radially outward from the other end periphery of the cylindrical portion and an outer ring portion extending axially toward the flange portion from an outer periphery of the sensing portion to partly surround the cylindrical portion, and wherein the sensor ring is a one piece product having the cylindrical portion, the flange portion, the sensing portion and the outer ring portion.

5. The sensor ring of claim 3 further including a plurality of rectangular or square openings formed in the sensing portion at constant intervals in the circumferential direction of the sensor ring, each opening being defined by a radially outer side which is furthest from a center of the sensor ring, a radially inner side which is closest to the center of the sensor ring and other two sides connecting ends of the radially outer side with ends of the radially inner side respectively, such that a radial position of the radially inner side of each opening is substantially the same as a radial position of an outer wall of the cylindrical portion of the sensor ring and a radial position of the radially outer side of each opening is substantially the same as a radial position of an inner wall of the ring portion.

6. The sensor ring of claim 4 further including a plurality of rectangular or square openings formed in the sensing portion at constant intervals in the circumferential direction of the sensor ring, each opening being defined by a radially outer side which is furthest from a center of the sensor ring, a radially inner side which is closest to the center of the sensor ring and other two sides connecting ends of the radially outer side with one of the radially inner side respectively, such that a radial position of the radially inner side of each opening is substantially the same as a radial position of an outer wall of the cylindrical portion of the sensor ring and a radial position of the radially outer side of each opening is substantially the same as a radial position of an inner wall of the ring portion.

7. A method of manufacturing a sensor ring from a blank of single plate material, the blank including a cylindrical portion, a sensing portion extending radially outward from one end periphery of the cylindrical portion and an outer ring portion extending axially toward the other end periphery of the cylindrical portion from an outer periphery of the sensing portion to partly surround the cylindrical portion, comprising:

A) setting the blank on a lower mold of a first mold unit with the sensing portion being directed downward toward the lower mold and the cylindrical portion being engaged with a nest plate provided on the lower mold;

B) lowering a presser mold toward the lower mold until it w is received in a space defined by the cylindrical portion, sensing portion and outer ring portion so that the sensing portion is clamped between the presser mold and lower mold and the blank is held in position;

C) lowering a plurality of pierce punches toward the lower mold in such a way that downward movement of the pierce punches is guided by the presser mold, to make a plurality of rectangular or square openings in the sensing portion at constant pitches in the circumferential direction of the sensing portion;

D) removing the blank from the lower mold;

E) setting the blank on a second mold unit such that an inner wall of the cylindrical portion is supported by a first nest pin, the downwardly directed face of the sensing portion is supported by a stationary punch and an outer wall of the cylindrical portion Is supported by a movable mold with an upper length of the cylindrical portion slightly projecting upward from the movable mold; and F) lowering an upper mold punch to sandwich the projecting length of the cylindrical portion between the upper mold punch and the movable mold thereby bending the projection length radially outward to form a flange portion of the sensor ring.

8. The method of claim 7, wherein the pierce punches are arranged with twice the pitch of the openings formed in the sensing portion In the circumferential direction so that the step (C) includes a first substep of forming half of the openings in the sensing portion and a second substep of forming the other half of the openings.

9. The method of claim 8 further including a third substep step of rotating the blank by one pitch of the openings between the first and second substeps.

10. The method of claim 8, wherein the lower mold of the first mold unit has a plurality of punch holes to receive the pierce punches respectively when the openings are formed by pierce punches.

11. The method of claim 9 wherein at least one second nest pin is provided in the lower mold between predetermined punch holes such that the second nest pin projects from the upper surface of the lower mold and fits in one of the pierced openings after the third substep.

12. The method of claim 11, wherein a hole or recess for receiving the second nest pin is formed in the lower mold.

13. The method of claim 11, where the second nest pin has a sharp pointed free end.

14. The method of claim 12, wherein the pin hole has an generally oval cross section with its major axis extending in a radial direction of the sensor ring so that the pin hole is larger than the punch holes in the radial direction.

15. The method of claim 7, wherein each of the pierce punches has a rectangular or square cross section and the presser mold has rectangular or square grooves to slidably engage with and guide the pierce punches when the pierce punches form the openings in the sensing portion.

16. The method of claim 7, wherein the upper mold punch of the second mold unit has a smaller diameter portion which slidably contacts the inner wall of the cylindrical portion of the blank to push down the second nest pin when the upper mold punch is lowered, a larger diameter portion formed on the smaller diameter portion for bending the projecting length of the cylindrical portion of the blank in a radially outward direction, and a C surface formed at connection between the smaller and larger diameter portions.

17. The method of claim 16, wherein the projecting length of the cylindrical portion is determined to have a size such that the corner defined by a horizontal end face of the projecting length and the vertical inner wall of the cylindrical portion is squeezed by the lower surface of the large diameter portion of the upper mold punch outside the C surface.

18. An arrangement for detecting rotations of a rotating element, comprising:

a sensor ring to be coaxially mounted on a free end portion of a rotating element, the free end portion being defined by an axially extending cylindrical surface, a radial stop surface radially extending from the cylindrical surface and a curvature surface connecting the cylindrical surface with the radial stop surface, the sensor ring including:

a cylindrical portion defining a cylindrical center opening to be press fitted over the axially extending cylindrical surface of the free end portion of the rotating element, a flange portion extending diagonally in a radially outward direction from one end periphery of the cylindrical portion such that the flange portion avoids the curvature surface between the cylindrical surface and the radial stop surface of the free end of the rotating element and abuts on the radial stop surface when the sensor ring is completely mounted on the free end portion of the rotating element, and an annular sensing portion extending radially outward from the other end periphery of the cylindrical portion, the sensing portion having a plurality of openings at constant intervals in the circumferential direction of the sensing portion to define teeth between each two adjacent openings; and a sensor exposed to the sensor ring for detecting the teeth of the sensing portion and in turn rotations of the rotating element;

wherein the flange portion of the sensor ring has a chamfered surface on its inner wall exposed to the connection curvature of the free end portion of the rotating element to avoid the connection curvature of the free end portion of the rotating element.

19. The arrangement of claim 18, wherein a free end of the flange portion which abuts on the stop surface of the rotating element upon mounting of the sensor ring on the rotating element has a planar abutment surface such that the flange portion plane-contacts the stop surface of the rotating element.

20. The arrangement of claim 18 further including an outer ring portion extending axially toward the flange portion from an outer periphery of the sensing portion to partly surround the cylindrical portion.

21. The arrangement of claim 19 further including an outer ring portion extending axially toward the flange portion from an outer periphery of the sensing portion to partly surround the cylindrical portion.

22. The arrangement of claim 21, wherein the sensor ring is a one piece product having the cylindrical portion, the flange portion, the sensing portion and the outer ring portion.

23. The arrangement of claim 20, wherein the sensor ring is a one piece product having the cylindrical portion, the flange portion, the sensing portion and the outer ring portion.

24. The arrangement of claim 18, wherein each of the plurality of openings has a radially outer side which is furthest from a center of the sensor ring, a radially inner side which is closest to the center of the sensor ring and other two sides connecting ends of the radially outer side with ends of the radially inner side respectively, such that a radial position of the radially inner side of each opening is substantially the same as a radial position of an outer wall of the cylindrical portion of the sensor ring and a radial position of the radially outer side of each opening is substantially the same as a radial position of an inner wall of the ring portion.

25. The arrangement of claim 22, wherein each of the plurality of openings has a radially outer side which is furthest from a center of the sensor ring, a radially inner side which is closest to the center of the sensor ring and other two sides connecting ends of the radially outlet side with ends of the radially inner side respectively, such that a radial position of the radially inner side of each opening is substantially the same as a radial position of an outer wall of the cylindrical portion of the sensor ring and a radial position of the radially outer side of each opening is substantially the same as a radial position of an inner wall of the ring portion.

26. The arrangement of claim 23, wherein each of the plurality of openings has a radially outer side which is furthest from a center of the sensor ring, a radially inner side which is closest to the center of the sensor ring and other two sides connecting ends of the radially outer side with ends of the radially inner side respectively, such that a radial position of the radially inner side of each opening is substantially the same as a radial position of an outer wall of the cylindrical portion of the sensor ring and a radial position of the radially outer side of each opening is substantially the same as a radial position of an inner wall of the ring portion.

27. A sensor ring manufactured according to the method of claim 7.

28. The sensor ring of claim 3 manufactured from a blank of single plate material by a method comprising:
  A) setting the blank on a lower mold of a first mold unit with the sensing portion being directed downward toward the lower mold and the cylindrical portion being engaged with a nest plate provided on the lower mold;
  B) lowering a presser mold toward the lower mold until the presser mold is received in a space defined by the cylindrical portion, sensing portion and outer ring portion so that the sensing portion is clamped between the presser mold and lower mold and the blank is held in position;
  C) lowering a plurality of pierce punches toward the lower mold in such a way that downward movement of the pierce punches is guided by the presser mold, to make a plurality of rectangular or square openings in the sensing portion at constant pitches in the circumferential direction of the sensing portion;
  D) removing the blank from the lower mold;
  E) setting the blank on a second mold unit such that an inner wall of the cylindrical portion is supported by a first nest pin, the downwardly directed face of the sensing portion is supported by a stationary punch and an outer wall of the cylindrical portion is supported by a movable mold with an upper length of the cylindrical portion slightly projecting upward from the movable mold; and
  F) lowering an upper mold punch to sandwich the projecting length of the cylindrical portion between the upper mold punch and the movable mold thereby bending the projection length radially outward to form the flange portion of the sensor ring.

29. The arrangement of claim 18, wherein the sensor ring is manufactured from a blank of single plate material by a method comprising:
  A) setting the blank on a lower mold of a first mold unit with the sensing portion being directed downward toward the lower mold and the cylindrical portion being engaged with a nest plate provided on the lower mold;
  B) lowering a presser mold toward the lower mold until the presser mold is received in a space defined by the cylindrical portion, sensing portion and outer ring portion so that the sensing portion is clamped between the presser mold and lower mold and the blank is held in position;
  C) lowering a plurality of pierce punches toward the lower mold in such a way that downward movement of the pierce punches is guided by the presser mold, to make a plurality of rectangular or square openings in the sensing portion at constant pitches in the circumferential direction of the sensing portion;
  D) removing the blank from the lower mold;
  E) setting the blank on a second mold unit such that an inner wall of the cylindrical portion is supported by a first nest pin, the downwardly directed face of the sensing portion is supported by a stationary punch and an outer wall of the cylindrical portion is supported by a movable mold with an upper length of the cylindrical portion slightly projecting upward from the movable mold; and
  F) lowering an upper mold punch to sandwich the projecting length of the cylindrical portion between the upper mold punch and the movable mold thereby bending the projection length radially outward to form the flange portion of the sensor ring.

30. The method of claim 16, wherein the movable mold has a vertically cylindrical surface which is exposed to and surrounds the peripheral wall of the small diameter portion of the upper mold punch, a horizontal annular surface which is exposed to the annular lower surface of the large diameter portion of the upper mold punch outside the C surface and a tapered surface which is exposed to the C surface of the upper mold punch and connects the vertical surface with the horizontal surface, and the tapered surface of the movable mold is steeper than the C surface.

31. The method of claim 30 wherein a length of the tapered surface is about one half of that of the C surface in the radial direction of the sensor ring.

32. The method of claim 30 wherein a height of the tapered surface is greater than that of the C surface.

* * * * *

UNITED STATES PATENT AND TRADEMARK OFFICE
CERTIFICATE OF CORRECTION

PATENT NO. : 6,392,405 B1  Page 1 of 1
APPLICATION NO. : 09/070349
DATED : May 21, 2002
INVENTOR(S) : Nishizaki et al.

It is certified that error appears in the above-identified patent and that said Letters Patent is hereby corrected as shown below:

On The Title Page, Item (73)

Assignee should read: -- PRESS KOGYO CO., LTD (Kanagawa, JP) --

Signed and Sealed this

Seventeenth Day of April, 2007

JON W. DUDAS
*Director of the United States Patent and Trademark Office*